(12) United States Patent
Kowalski et al.

(10) Patent No.: US 8,857,606 B2
(45) Date of Patent: Oct. 14, 2014

(54) FORMED WINGED PULLEY

(75) Inventors: Nicholas L. Kowalski, Posen, MI (US);
Brian J. Konieczny, Posen, MI (US);
Matthew L. Gies, Alpena, MI (US)

(73) Assignee: Punching Concepts, Inc., Alpena, MI (US)

(*) Notice: Subject to any disclaimer, the term of this patent is extended or adjusted under 35 U.S.C. 154(b) by 127 days.

(21) Appl. No.: 13/533,490

(22) Filed: Jun. 26, 2012

(65) Prior Publication Data

US 2013/0341162 A1    Dec. 26, 2013

(51) Int. Cl.
*B65G 23/04* (2006.01)
*B65G 39/02* (2006.01)

(52) U.S. Cl.
CPC .............. *B65G 23/04* (2013.01); *B65G 39/02* (2013.01)
USPC .......................................... 198/835; 198/494

(58) Field of Classification Search
CPC ...... B65G 39/00; B65G 39/02; B65G 39/073; B65G 23/04
USPC .................... 198/494, 835, 834, 842
See application file for complete search history.

(56) References Cited

U.S. PATENT DOCUMENTS

| | | | |
|---|---|---|---|
| 1,335,421 A | 3/1920 | Black | |
| 1,980,777 A | 11/1934 | Zollinger | |
| 3,038,590 A | 6/1962 | Arndt | |
| 3,046,805 A | 7/1962 | Van Gorp | |
| 3,055,229 A | 9/1962 | Mecham | |
| 3,354,735 A | 11/1967 | Holz | |
| 3,812,562 A * | 5/1974 | Lovett | 29/895.21 |
| 3,995,487 A * | 12/1976 | Locke | 198/835 |
| 4,180,155 A | 12/1979 | Stevick | |
| 4,233,853 A | 11/1980 | Holz | |
| 4,284,409 A | 8/1981 | Van Teslaar | |
| 4,643,294 A | 2/1987 | Whited | |
| 4,718,544 A | 1/1988 | Herren | |
| 4,956,914 A * | 9/1990 | Valster et al. | 29/892.1 |
| 4,984,363 A | 1/1991 | Valster et al. | |
| 5,109,976 A | 5/1992 | Mohri et al. | |
| 5,190,146 A | 3/1993 | Valster et al. | |
| 5,205,796 A * | 4/1993 | Valster et al. | 474/185 |
| 5,209,704 A | 5/1993 | Valster et al. | |
| 6,938,754 B2 | 9/2005 | Kanaris | |
| 7,070,042 B2 | 7/2006 | Dow et al. | |
| 7,527,142 B1 | 5/2009 | Zeltwanger et al. | |
| 8,579,774 B2 * | 11/2013 | Derscheid | 198/835 |
| 2011/0315517 A1 * | 12/2011 | Laughlin | 198/842 |
| 2012/0186945 A1 * | 7/2012 | Laughlin | 198/494 |

OTHER PUBLICATIONS

CEMA Standard 501.1, Specification for Welded Steel Wing Pulleys, Conveyor Equipment Manufacturers Association, ANSI/CEMA 501. 1-2003 (2009).

* cited by examiner

*Primary Examiner* — James R Bidwell
(74) *Attorney, Agent, or Firm* — Warner Norcross & Judd LLP

(57) ABSTRACT

A formed wing pulley for use in belt conveyor applications. The pulley consists of a plurality of formed wings with or without clean-out ports, mated to a positive placement polygon shaped core. The polygon core may be mated to hubs and/or end disks with centered hubs, which can be locked onto to a fixed or rotating shaft. Each formed wing of the pulley may be mated to the positive placement polygon core at the bottom side of the wing profile, and can have round, half round, hex, or flat wing tips that serve as the contact surface or the tops of wings may serve directly as the contact surface for the belt at the top side of the wing profile. When in assembled form, the formed wing pulley provides a set of radial wings that rotate about a central axis to support conveyor belt operation.

17 Claims, 10 Drawing Sheets

FORMED WINGED PULLEY

BACKGROUND OF THE INVENTION

The present invention relates to conveyor belt pulleys, and more particularly to self cleaning wing pulleys that are suited for bulk material handling applications. In these applications, material can stick to or become entrapped behind the conveyor belt. When material is behind the conveyor belt, it is considered debris that must be displaced from the system for optimum conveyor belt traction and belt life.

The use of conventional wing pulleys in belt conveyor applications is a well-known practice which is used for a wide variety of bulk materials. The conventional wing pulley can range from 3.5" in diameter up to 60" (and larger) in diameter, and from 4" in length to 100" (and longer) in length. Each pulley is constructed from material and thicknesses that are appropriate for the size and rigor of the final application.

The conventional wing pulley design utilizes full length straight wings mated to set of hubs that define the central rotating axis for the pulley. The design and manufacture of the conventional wing pulley is guided by ANSI/CEMA (American National Standards Institute/Conveyor Equipment Manufacturing Association) 501.1-2003(R2009) Specifications for Welded Steel Wing Pulleys.

The conventional wing pulley, while generally considered an ideal self cleaning pulley, has been found to have limitations. When used in bulk material handling applications, the conventional wing pulley does in fact break material loose from the back side of the belt through the impact of the wing on the belt, but the material falls between the wings of the pulley and is re-circulated between the belt and pulley multiple times before being cleared from the system.

The straight wing by design generates a high level of noise. As the straight wings of the conventional pulley come in contact with the moving conveyor belt the impact of the full length wing hitting the belt at single impact creates a slapping sound. Additionally, in conveyor systems handling large belts and material loads, the straight wing pulley has been known to fail due to the straight wing design. As loads are increased, the wings have a tendency to fold over; this is due in part to limited strength of the wings when perpendicularly aligned to the direction belt travel.

Although there is an existing and enduring demand for straight wing pulleys, there remains a need for a formed wing pulley that provide more aggressive belt and debris cleaning capability while providing quieter operation in bulk material handling applications.

SUMMARY OF THE INVENTION

The present invention provides a formed wing pulley configured with formed (for example, trapezoidal shaped) wings that provide the belt beating benefits of a traditional straight wing pulley and a formed wing that maximizes the displacement of debris which has a tendency to become entrapped between the belt and pulley. The formed wing is also stronger and operates more quietly than the straight wing pulley design.

In various embodiments, the formed wing pulley may include one or more of the following and other unique features:

1. Polygon Core.

The positive placement polygon core may be mated to a set of hubs that are designed for pulley applications. This polygon core serves as the rigid cyclic equilateral polygon substructure for the pulley and aligns the hubs. The inner surfaces of the polygon core contact the outer diameter of the hubs. The size of the polygon core can be increased or decreased through the use of smaller and larger hubs. With the positive placement polygon core, a symmetrical and repetitive set of surfaces is created for mating the pulley wings. The formed wings of the pulley are manufactured with a bottom edge profile that only allows each wing to be properly fitted on the polygon core by contacting multiple surfaces. In embodiments where the radial wing angles are varied, offset or staggered, multiple bottom wing profiles are used.

2. End Disks.

In embodiments where the outside diameter of the pulley creates a condition where the pulley wings exceed the desired wing height in an upright position, end disks may be used to strengthen and lighten the pulley by moving the polygon core outward, effectively reducing the overall pulley wing height and weight. Optimizing wing height reduces the opportunity for pulley failure due to wing fold over and increases the overall strength of the wing pulley. These end disks are mated to the hubs increasing the diameter of the polygon core. The polygon core at this greater size maintains the cyclic equilateral polygon shape and positive placement feature of the direct to hub style polygon core.

3. Formed (Trapezoidal Shaped) Wings.

The formed (trapezoidal shaped) wing has a flat straight section of wing parallel to the shaft and axis of rotation. The wings then angle back from the straight section of the wing at an angle defined as a function of the pulley's overall length, polygon core diameter, and outside diameter. Any variation in any of these lengths will change the angle of the wing relative to the straight section at or near the center of the wing. The wing can be symmetrical or asymmetrical about a center plane perpendicular to the rotational axis dependent on application. While the wing shape of this embodiment is depicted as trapezoidal, other combinations of angles and curves can be formed for positive placement on the polygon core. The shape of the formed wing by design provides the belt beating benefits of a straight wing pulley, but improves upon the design by adding belt support, advanced cleaning, self gusseting, and sound dampening features through the incorporation of the angled portion of the wing.

4. Wing Tips.

Wing tips for the formed wing pulley can be constructed form a variety of material shapes that may include round, rectangular, hex, and half round. In some embodiments, no wing tips will be installed; the top surface of the wing will serve as the contact surface with the conveyor belt. Wing tips can be constructed of one or multiple pieces that follow the profile of the wing. The wing tips are attached to the top profile of the wing and provide a wear surface that is greater than the width of the pulley wing.

5. Clean-Out Ports.

In one embodiment, clean-out ports are included in the body of the wing to provide a means to accelerate the rate at which debris is displaced when the pulley is in use. Clean-out ports are sections of the wing that have been removed to allow material to move between wing openings. These clean-out ports can be made from any combination of shapes and sizes, and can be made in the outer/inner profile or main body of any combination of wings. The clean-out ports allow small material to pass from one opening of the wing into the next when the pulley is in use. This allows material that could have a tendency to become trapped between the belt and wings of a conventional straight wing pulley a means to pass into the next wing opening, and be deflected outward at an accelerated rate. In other embodiments, the wing body is solid without clean-out ports, or the cleanout ports can be in multiple locations on multiple wings.

DETAILED DESCRIPTION OF THE PREFERRED EMBODIMENT

The formed wing pulley in accordance with one embodiment of the present invention is shown in FIGS. 1-10. The formed wing pulley (1) is particularly well suited for belt conveyor applications as a Tail or Take-up pulley, but can be used as a drive, idler, or at any position within the conveyor system. In these applications, the pulley (1) is able to apply the tension required to run the belt while providing the belt cleaning capability that optimizes belt traction for the drive pulley.

Figure 1:
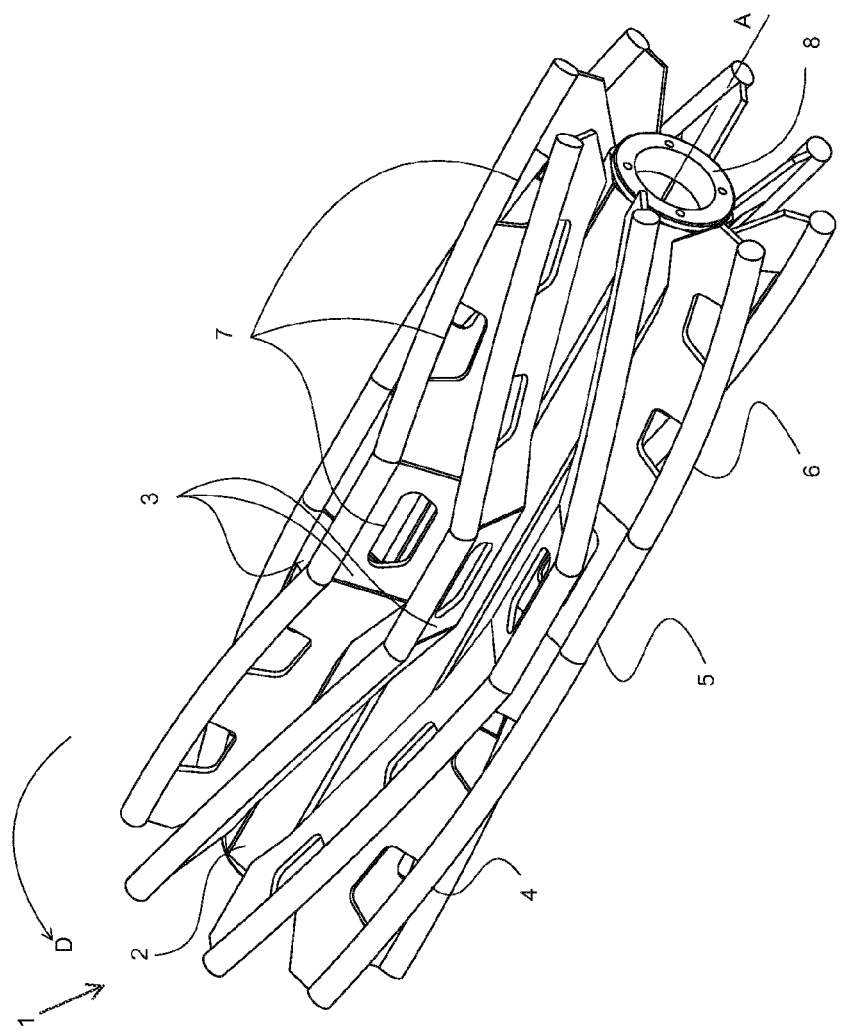
FIG. 1—Isometric view of a formed wing pulley.

Referring now to the embodiment of FIG. 1, the pulley (1) includes a polygon core (2), which is used as the rigid substructure of the pulley (1). The polygon core (2) is mated to two hubs (8) that are used to lock the pulley (1) to a shaft in a fixed location. The polygon core (2) of this embodiment is formed to a cyclic equilateral polygon with the number of sides equal to or divisible by the number of wings (3) of the pulley (1). The shape of the polygon core (2) allows for efficient assembly of the wing pulley (1), as the wings (3) are designed with a bottom profile that contacts multiple surfaces of the polygon core (2) for exact wing (3) alignment. In embodiments where the radial wing angles are varied, offset or staggered, multiple bottom wing (3) profiles are used. Although the polygon core of FIG. 1 is a closed polygon, the core need not be a closed shape, but may instead include one or more gaps, for example, between adjacent sides of the core. Accordingly, the term "polygon core" should not be interpreted to require a closed polygon, but should also encompass configurations in which there are gaps in the core, such as gaps between one or more of the adjacent sides. A plurality of wings (3) is attached to the polygon core (2) in a radial pattern. The number of wings (3) of the pulley (1) is a function of the pulley's (1) length, outside diameter, and polygon core (2) diameter. Fixed to the wings (3) are wing tips (4,5,6) that follow the profile of all formed wing (3) to maintain the radial wing pattern and serve as the contact/wear surface for the wing (3). The wing tips (4,5,6) depicted in FIG. 1 are round bar, but can be constructed from flat plate, half round, hex or other ferrous or non-ferrous metals, plastics or composite shapes. In some embodiments no wing tips (4,5,6) will be installed, and the top surface of the wing (3) will serve as the contact surface with the conveyor belt.

In one embodiment depicted in FIG. 1 the wing (3) includes clean-out ports (7). When included, clean-out ports (7) allow material to pass from one wing opening into the next in applications were small bulk material is being handled. Clean-out ports (7) are most effective in formed wing pulley applications. These clean-out ports (7) are sections of wing (3) that have been cut away or not included, and can include any combination of shapes, sizes, and locations in the body of any or all wings (3). The number of clean-out ports (7) may also vary from application to application. The clean-out ports (7) can be formed at the point of casting, extrusion, or forging, or can be removed from the wing (3) via cutting, milling, punching, or shearing.

Figure 2:
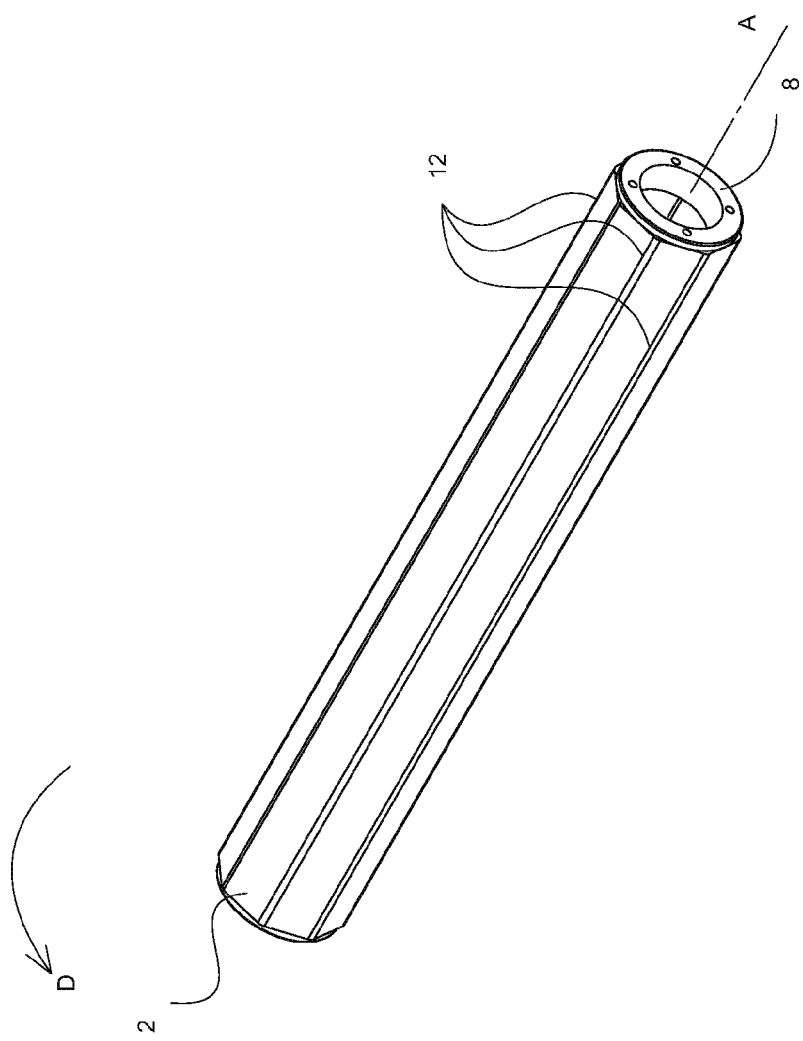
FIG. 2—Isometric view of the positive placement polygon core with hubs.

The polygon core (2) of the pulley (1) is shown in FIG. 2. In this figure, the polygon core (2) is connected to two hubs (8) that lock the pulley (1) onto a shaft. In this embodiment, the polygon core (2) includes eight sides, but the number of sides may vary, as desired. The polygon core (2) assembly of FIG. 2 is constructed from ferrous or non-ferrous metals, plastics or composite materials. The polygon core (2) can be constructed from one or multiple pieces of material cast, extruded, forged, bent, cut and/or rolled plates and shapes that create the desired cyclic equilateral polygon shape. The cyclic equilateral polygon shape is calculated based on a common number of corner/bends/seams and sides. Where "n" is the required number of polygon sides, the angle "α" of each bend/seam can be calculated as $\alpha=180*(n-2)/n$. All seams of the polygon core (2) and hubs (8) may be stitch or continuous welded, glued, bonded, or mechanically fastened to create a single subassembly. As noted above, one or more gaps may exist in the core, for example, between adjacent sides of the core. The central axis of the hubs (8) and polygon core (2) create an axis (A) that the assembled pulley (1) will rotate (D) about. The polygon core (2) diameter can be increased or decreased through the used or smaller or larger diameter hub (8), or the use of end disks (9).

Figure 3:
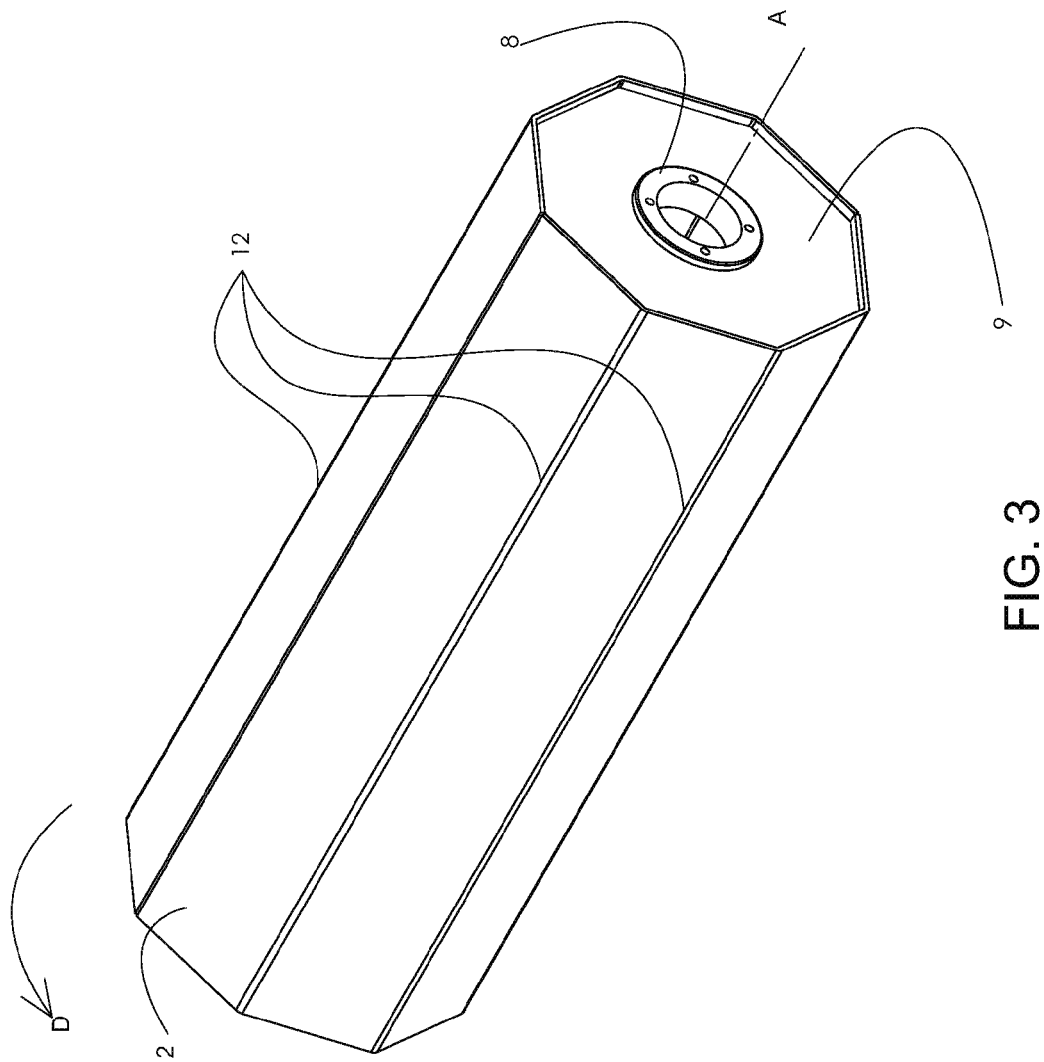
FIG. 3—Isometric view of a positive placement polygon core with end disks for large diameter pulleys.

To maintain an optimum wing height that minimizes the risk of wing fold over for the formed wing pulley, the size of the polygon core (2) can be increased or decreased in size through the use of different size hubs (8) or end disks (9). FIG. 3, shows how the overall sizes of the polygon core (2) can be increased with the use of end disks (9). The cyclic equilateral polygon shape is calculated based on a common number of corners/bends/seams and sides. Where "n" is the required number of polygon sides, the angle "α" of each bend/seam can be calculated as $\alpha=180*(n-2)/n$. The end disks (9) can be cast, extruded, or cut for one or multiple pieces of ferrous or non-ferrous metal, plastics or composites to fit onto the hubs (8), held parallel to the face of the hubs (8) and perpendicular to axis (A). Through increasing the size of the end disks (9) the overall size of the pulley (1) can be increased while maintaining a desired wing (3) height. The polygon core (2) is then assembled to the outer perimeter of the end disks (9). Through stitch or continuous weld, glue, bonding, or mechanical fastening techniques, the polygon core (2), end disks (9) and hubs (8) are secured to create a single subassembly.

Figure 4:
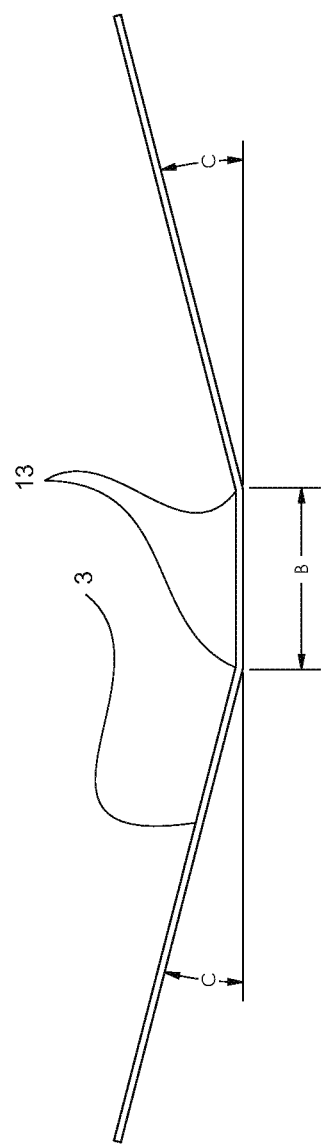
FIG. 4—Top view of a formed (trapezoidal shaped) wing.
Figure 7:
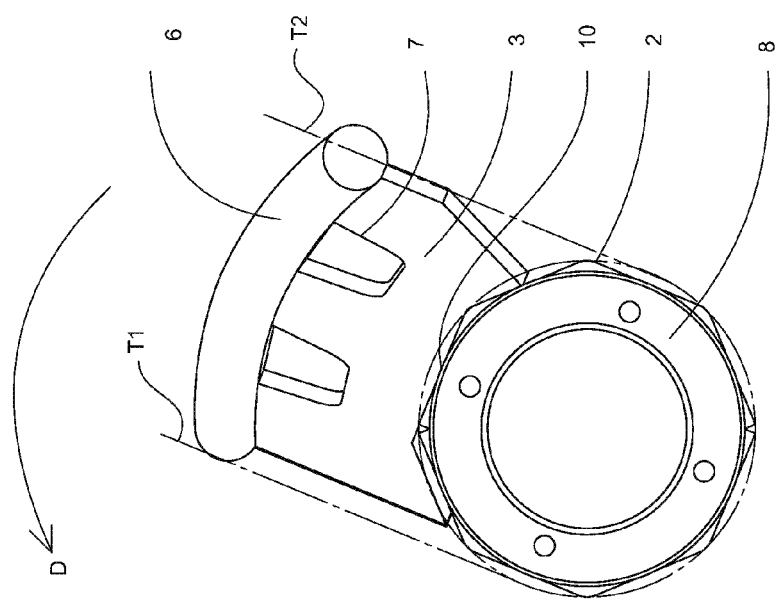
FIG. 7—End view of a single formed wing placed on the positive placement polygon core.
Figure 8:
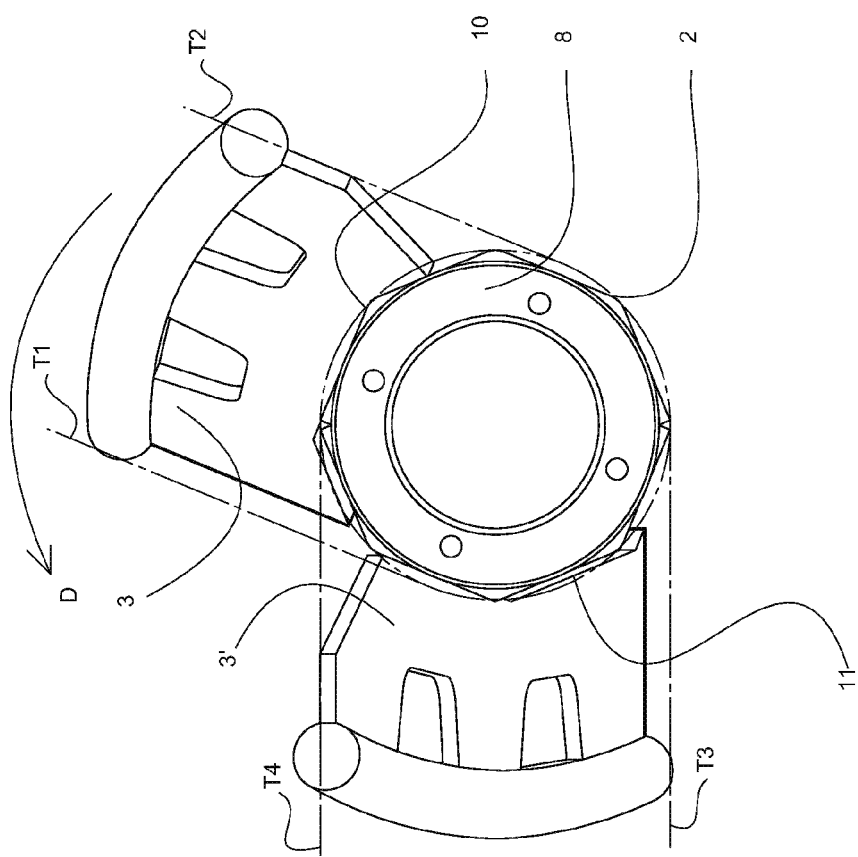
FIG. 8—End view of two alternating wing profiles that increase the number of wing on the polygon core—multiple wings that fit multiple ways.
Figure 9:
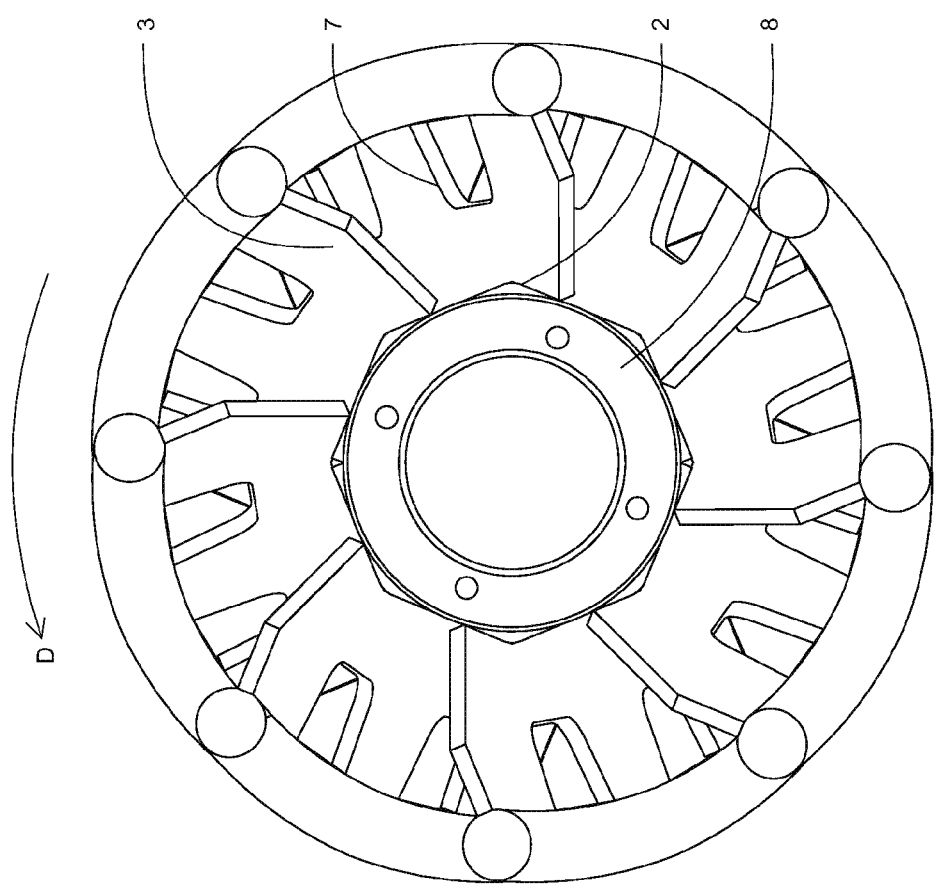
FIG. 9—End view of all wings placed on a positive placement polygon core.

The wings (3) of the formed wing pulley (1) can be constructed in essentially any combination of bends and curves that will perform the desired function(s), such as assist in accelerating debris outward as the pulley (1) rotates. The formed wing (3) of the pulley (1) can be cast, extruded, forged, bent, cut, and/or rolled from plates and shapes of ferrous or non-ferrous metals, plastics or composites to produce the required formed wing (3) shape and features. In the embodiment of FIG. 4, the wing (3) is formed to create a trapezoidal shape, which provides a flat/straight section (B) at the center of the wing (3) that can, among other things, create a belt beater bar effect at the center of the pulley (1) where the highest volume of bulk material often comes in contact with the conveyor belt. The wing (3) of FIG. 4 is then formed at bends (13) to angle (C), which in this embodiment is derived as a function the pulleys (1) outside diameter, polygon core (2) diameter and length. The angled wing uses centripetal force of the pulleys (1) rotation to guide the debris outward down the length of the wing (3), effectively clearing debris with minimal recirculation. The angled portion of the wing may support the belt for the straight section (B) of the tailing/next wing (3) of the pulley (1), add strength to the overall wing (3), and dampen the sound generated by the pulley (1) during operation. The shape of the wing may vary from application to application, as desired. However, in the embodiment of FIG. 4, the straight section (B) of the wing (3) is located at or near the center of the wing (3) parallel to axis (A) and extends parallel to a diameter of the pulley (1) drawn through the approximate center of the wing (3) (when viewed from the end (See FIG. 8)). In other words, in this embodiment, the straight section (B) of the wing (3) extends along a plane that is generally parallel to tangent plane (T1). The straight section (B) of the wing (3) may extend essentially coextensively with tangent plane (T1) or it may be offset from that plane, if desired. In this embodiment, the straight section (B) of the wing (3) is offset inwardly from the tangent plane (T1) a relatively small distance, for example, about 3/8 of an inch. The length of the straight section (B) of the wing (3) may be variable dependant on various factors, such as the length of the pulley (1). In this embodiment, the two symmetrical angled portions of the wing (3) pivot from points (13) at angle (C), and are formed by lines roughly connecting opposite ends of the straight section (B) of the wing (3) and the "reverse corners" of the polygon core (2). More specifically, in this embodiment, the angled portions of the wing (3) extend from the straight section (B) away from the direction of rotation at angle (C) and terminate at or near the intersection of tangent plane T2 and opposite ends of the core. It should be understood that the relative position of wing (3) with respect to the polygon core (2) shown in FIG. 7 is merely exemplary, and that the position of the wing with respect to the core may vary. For example, FIG. 8 shows a second wing (3') in an alternative position. Like the first wing (3), the straight section (B) of the second wing (3') extends essentially parallel to tangent plane (T3) and the trailing ends of the second wing (3') terminate at or near the intersection of tangent plane (T4) and opposite ends of the core. However, as can be seen in FIG. 8, the second wing (3') is shifted with respect to the underlying sides of the polygon core (2). More specifically, the second wing (3') is roughly centered over the intersection between two adjacent sides of the polygon core—rather than centered over a single side of the polygon core. Based on the variance of the straight section (B) of wing (3), pulley length, and diameter of the polygon core (2), this wing angle (C) may change for every size pulley designed. Other factors, such as the overall dimensions of the pulley (1) may also be used to determine the number of wings (3) that are required for optimum pulley (1) performance. Although wing (3) is formed of three generally linear segments, the wing (3) need not be linear, but may alternatively follow a curved profile. For example, the straight section (b) and the angled sections may together follow a continuously curved profile or may follow a partially linear and partially curved profile.

Figure 5:
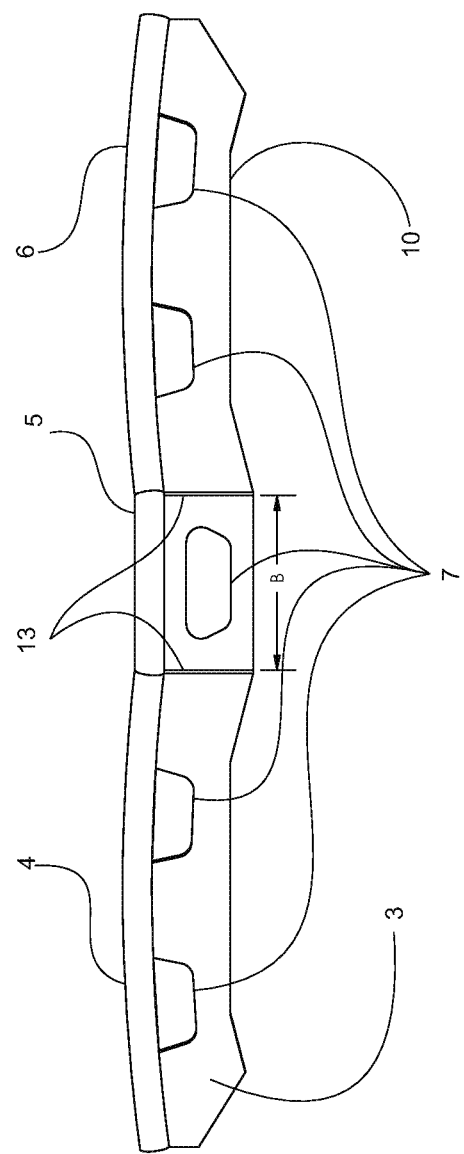
FIG. 5—Front view of a formed (trapezoidal shaped) wing with clean-out ports.

The front view of a formed wing (3) designed to fit onto a polygon core (2) is depicted in FIG. 5. The wing (3) is depicted in FIG. 5 with clean-out ports (7) removed from the body of the wing (3). Once the wing (3) is formed, the bottom profile (10) of the wing (3) creates a sufficiently exact mating surface for the positive placement polygon core (2). Every different pulley size may have a unique wing (3) shape and profile for assembling to the polygon core (2). Wing tips are formed to follow the top profile of any wing shape and provide a wear/contact surface greater than the cross section of the wing (3) to support the conveyor belt. In this embodiment, the wing tip (4,5,6) is constructed to follow the three profiles of the wing (3). Tip sections (4) and (6) follow the top profile of the wing (3) from point (13) to the outermost vertical edge of the wing (3), and tip section (5) follows the profile between the points (13). The wing tip (4,5,6) can be made from round bars, flat plate, half round, hex or other ferrous or non-ferrous metals, plastics or composite shapes. To achieve the required wing shape, the wing tips (4,5,6) can be cast, extruded, forged, bent, cut, and/or rolled from plates and shapes to mate to the top of the wing (3).

The wing tips (4,5,6) may be permanently attached to the wing (3) through stitch or continuous weld, glue, bonding, or mechanical fastening techniques.

Figure 6:
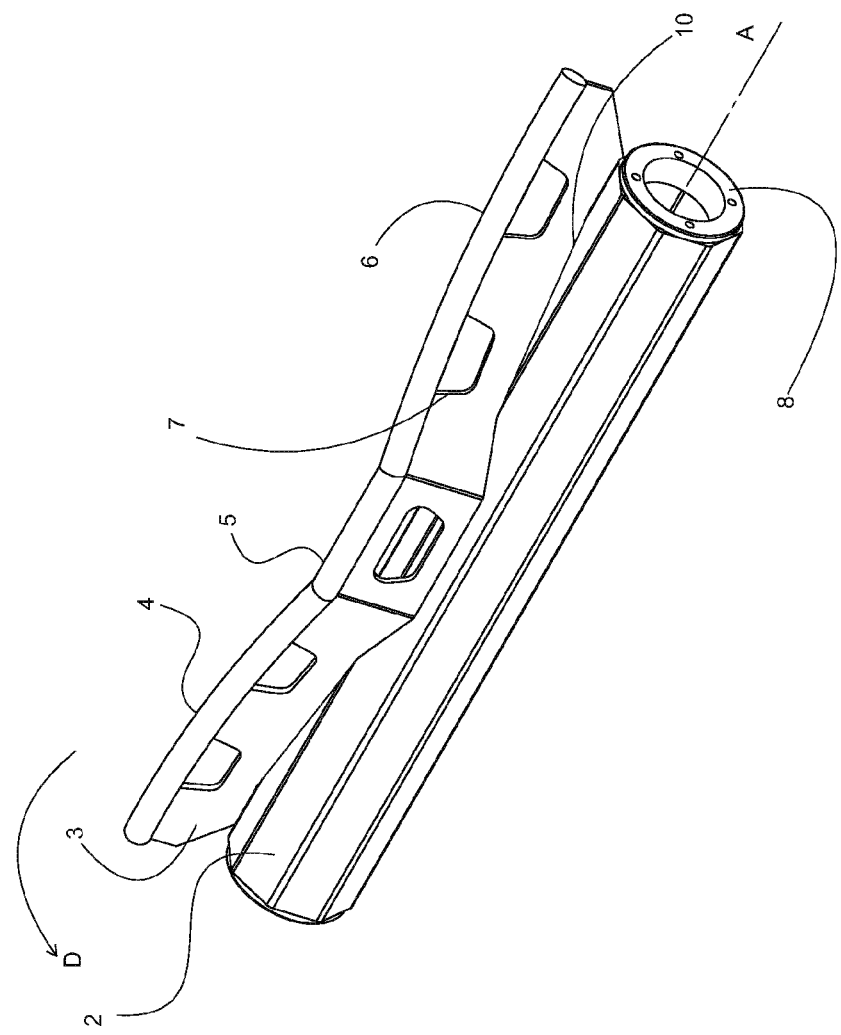
FIG. 6—Isometric view of a single formed wing placed on the positive placement polygon core.

FIG. 6 provides an isometric view of how a formed wing (3) fits onto the positive placement polygon core (2). The method of design for the formed wing pulley (1) creates a sufficiently exact mating surface between the formed wing (3) profile (10) and the polygon core (2). In the embodiment of FIG. 6, the formed wing (3) will only fit on the polygon core (2) one way and every wing (3) will fit exactly the same. In embodiments where the radial wing angles are varied, offset or staggered, multiple bottom wing (3) profiles may be used. This enables the assembly of the formed wing pulley (1) without the aid of alignment tools or fixtures. FIG. 7 provides an end view of how the formed wing (3) fits onto the polygon core (2) in one embodiment. The wings (3) are permanently fixed to the positive placement polygon core (2) through stitch or continuous weld, glue, or bonding techniques, or made removable through the use of bolts, pins, rivets and other mechanical fasteners.

In some instances, for example, where the number of wings (3) required for the pulley exceeds the number of sides of the polygon core (2), multiple profiles (10,11) can be formed into the lower edge of the wing (3), as depicted in FIG. 8. In this embodiment, the wing (3) has two unique profiles (10,11) that can be alternated about the pulley to increase the number of wings (3). The combination of wing (3) profiles, shapes, and pattern can be modified to meet the need of the pulley (1) application.

With all formed wings (3) assembled to the positive placement polygon core (2), the wings can provide 100% radial coverage at the outside diameter of the pulley (1). This can be seen in FIG. 9. The formed wings (3) can provide continuous support to the conveyor belt at all times during operation. In some embodiments a percent radial coverage less than 100% may be provided, dependent on application.

Figure 10:
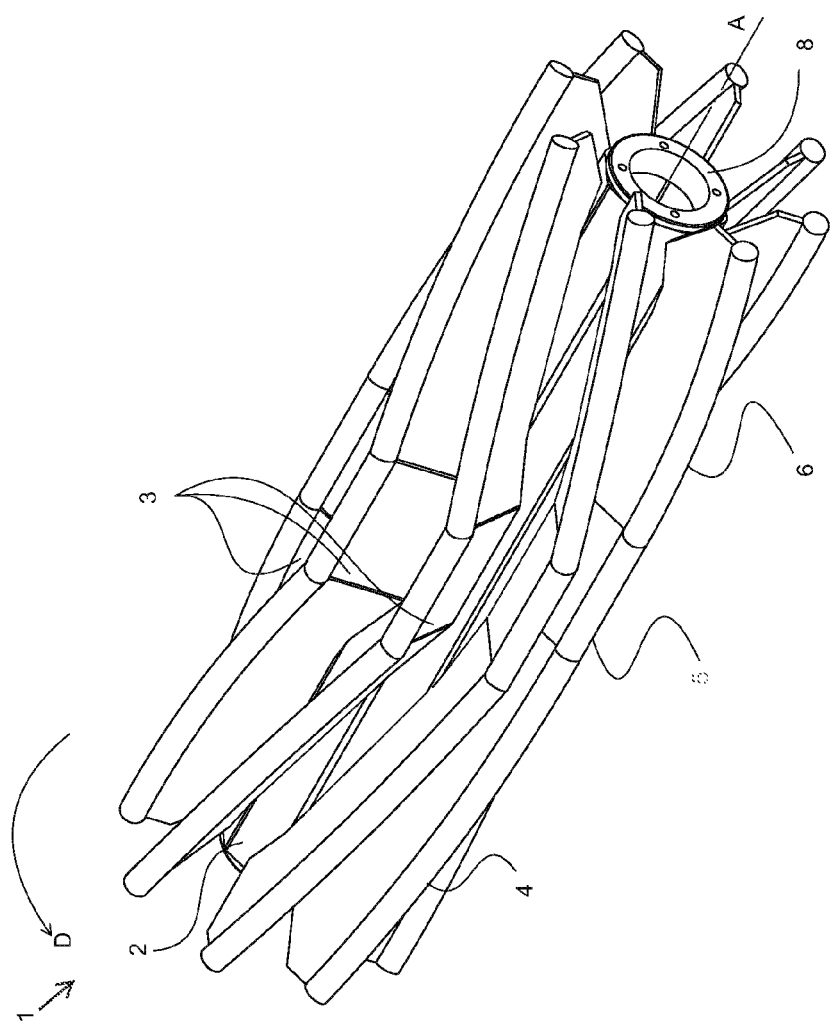
FIG. 10—Isometric view of a formed wing pulley without Clean-out Ports.

FIG. 10. depicts the formed wing pulley (1) without cleanout ports. In this embodiment, the formed wing (3) creates a smooth surface for debris to move along outward as the pulley (1) rotates.

The above description is that of the preferred embodiments of the invention. Various alterations and changes can be made without departing from the spirit and broader aspect of the invention as defined in the appended claims, which are to be interpreted in accordance with the principles of patent law including the doctrine of equivalents. Any reference to claim elements in the singular, for example, using the articles "a," "an," "the" or "said" is not to be construed as limiting the element to the singular.

The invention claimed is:

1. A wing pulley comprising:
a longitudinal core element defining an axis of rotation; and
a plurality of wings radially spaced apart about the core element, each of the plurality of wings including a plurality of wing segments that are angularly offset from each other, wherein the plurality of wing segments include a substantially planar central segment extending perpendicular to core element axis of rotation, and wherein the substantially planar central segment defines a clean out port extending therethrough.

2. A wing pulley comprising:
a longitudinal core element defining an axis of rotation; and
a plurality of wings radially spaced apart about the core element, each of the plurality of wings including a plurality of wing segments that are angularly offset from each other,
wherein the plurality of wing segments include a substantially planar central segment extending perpendicular to core element axis of rotation,
wherein the longitudinal core element includes first and second axial end portions and a plurality of planar sides extending therebetween, and
wherein the longitudinal core element includes an outer periphery defining a polygonal cross-section.

3. A wing pulley comprising:
a longitudinal core element defining an axis of rotation;
a plurality of wings radially spaced apart about the core element, each of the plurality of wings including a plurality of wing segments that are angularly offset from each other, wherein the plurality of wing segments include a substantially planar central segment extending perpendicular to core element axis of rotation; and
a plurality of wing tips each corresponding to one of the plurality of wings, wherein the wing tips include a central portion extending perpendicular to the core element axis of rotation.

4. A wing pulley comprising:
a polygonal core element including first and second axial end portions and a plurality of planar sides extending therebetween; and
a plurality of wings radially spaced apart about the polygonal core element, each of the plurality of wings including a plurality of wing segments, wherein each of the plurality of wing segments are supported by at least two of the plurality of planar sides.

5. The wing pulley of claim 4 wherein:
the polygonal core element defines an axis of rotation; and
the plurality of wing segments include a substantially planar central segment extending perpendicular to core element axis of rotation.

6. The wing pulley of claim 5 wherein the substantially planar central segment defines a clean out port extending therethrough.

7. The wing pulley of claim 4 further including first and second end disks to support the polygonal core element therebetween.

8. The wing pulley of claim 4 further including a plurality of wing tips each corresponding to one of the plurality of wings.

9. The wing pulley of claim 4 wherein each wing segment is angularly offset from the adjacent wing segment.

10. The wing pulley of claim 4 wherein the plurality of wings segments include a central wing segment and first and second angled wing segments disposed axially outward of the central wing segment.

11. A wing pulley comprising:
a core element defining an axis of rotation; and
a plurality of wings supported by the core element, each of the plurality of wings including a plurality of wing segments that are angularly offset from each, wherein at least one of the plurality of wing segments defines a clean out port extending therethrough in a direction generally perpendicular to the core element axis of rotation.

12. The wing pulley of claim 11 wherein each of the plurality of wings segments include a central wing segment and first and second outer wing segments.

13. The wing pulley of claim 12 wherein the central wing segment is substantially planar and extends perpendicular to the core element axis of rotation.

14. The wing pulley of claim 11 further including a plurality of wing tips each extending along one of the plurality of wings.

15. The wing pulley of claim 14 wherein each of the plurality of wing segments is supported by at least two of the plurality of planar sides.

16. The wing pulley of claim 11 wherein the core element includes first and second axial end portions and a plurality of planar sides extending therebetween.

17. The wing pulley of claim 11 wherein the core element includes an outer periphery defining a polygonal cross-section.

* * * * *